'N' PULSES PER SEC.

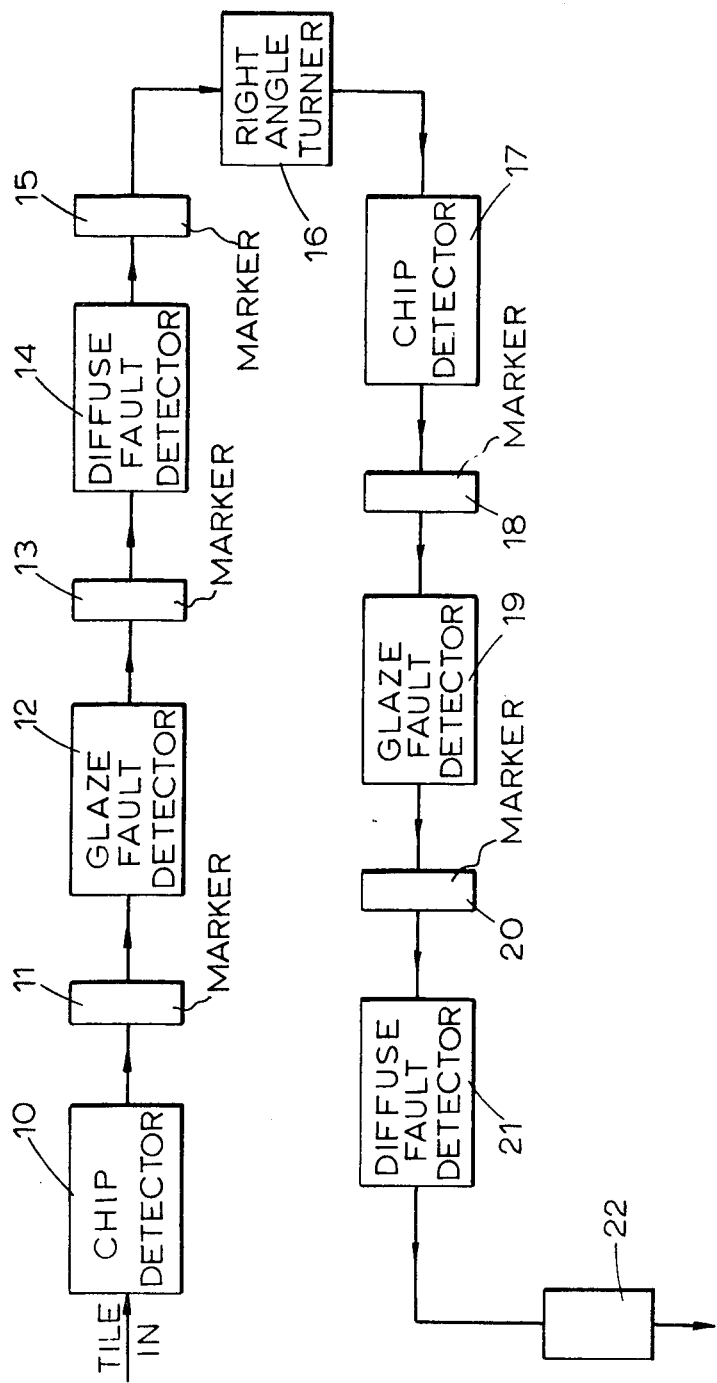

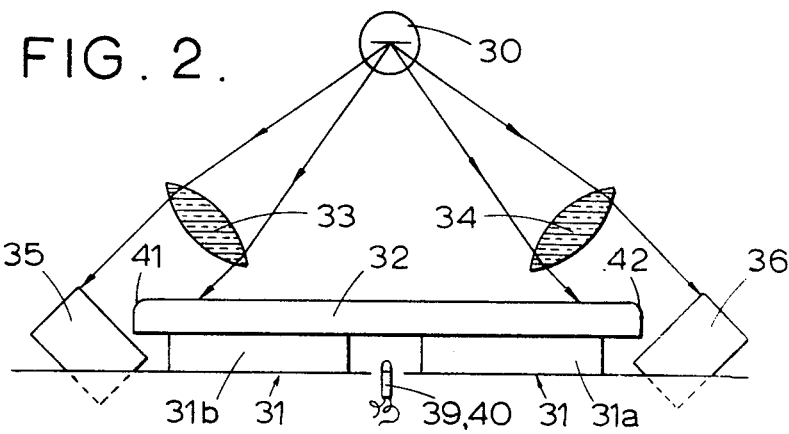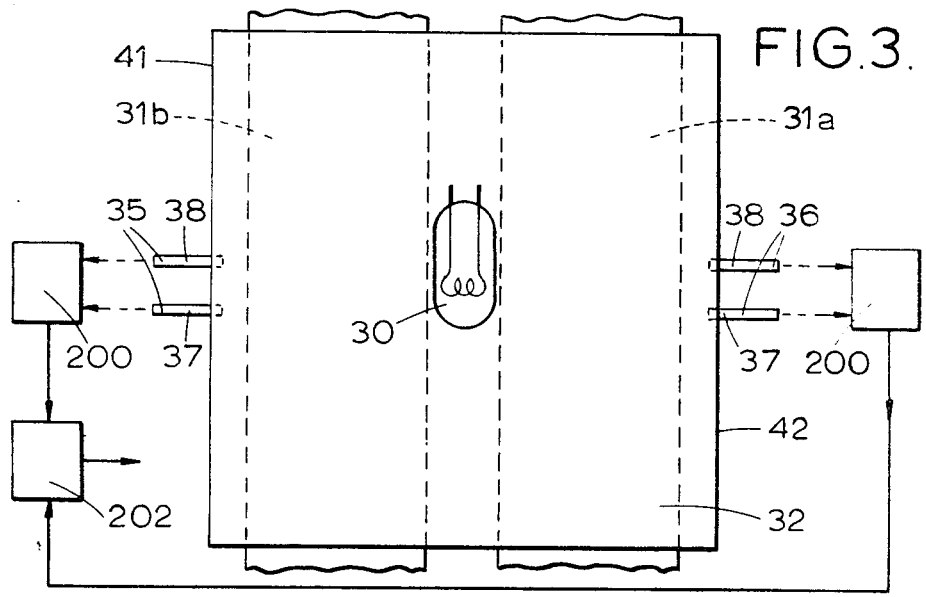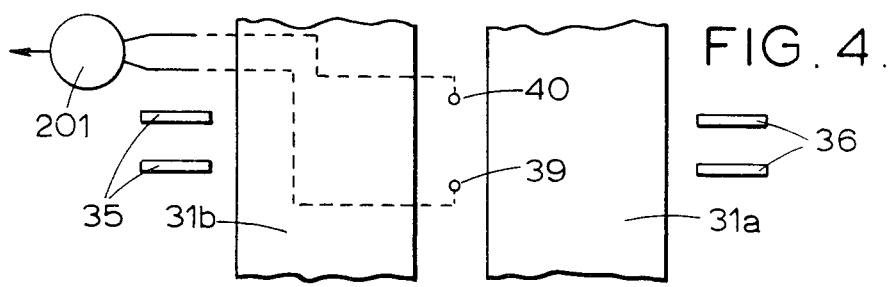

N.t. PULSES.

☐ INSPECTED FOR ALL FAULTS.

▧ INSPECTED FOR LARGE FAULTS.

▨ NOT INSPECTED AT ALL FOR SURFACE FAULTS.

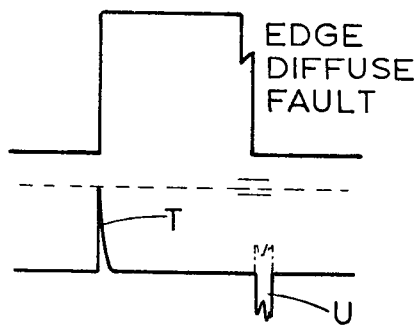
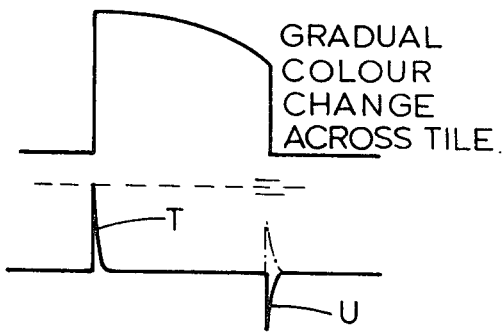
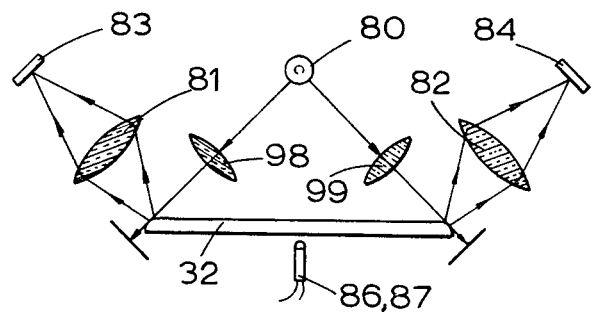
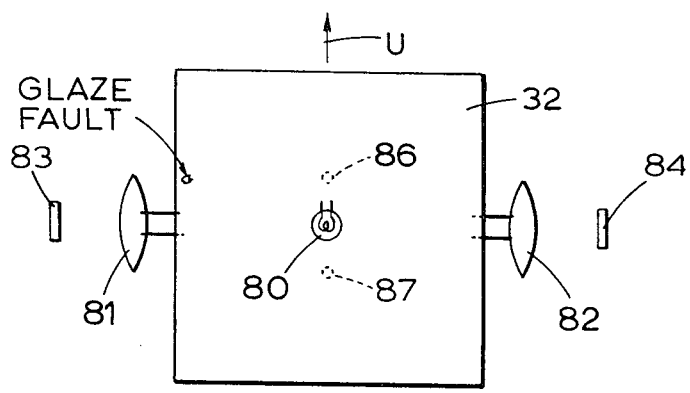

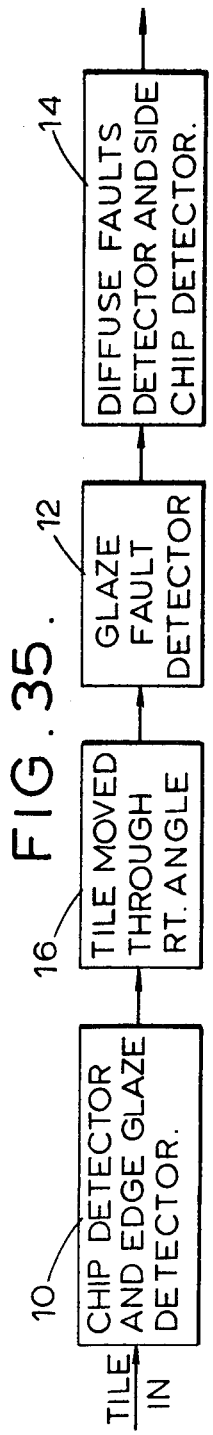
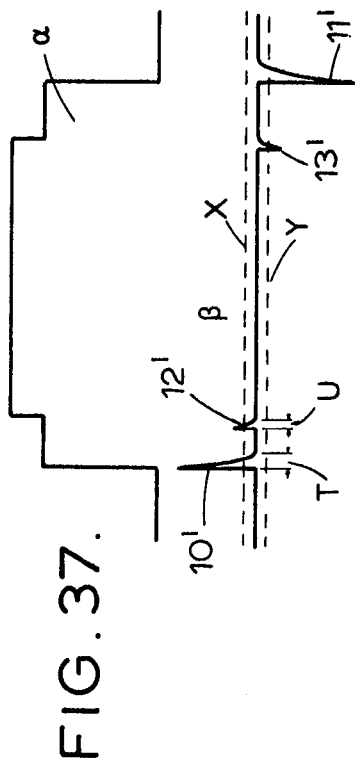
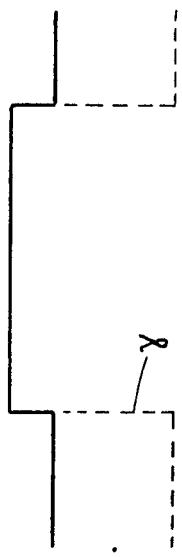
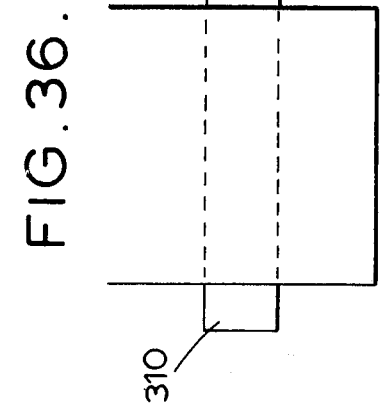
FIG. 35.
FIG. 37.
FIG. 38.
FIG. 36.

United States Patent Office 3,676,008
Patented July 11, 1972

3,676,008
METHOD AND ELECTRO-OPTICAL SYSTEM FOR INSPECTING BODIES SUCH AS TILES
Robert N. West, Orpington, Richard A. Brook, Bromley, Richard G. Shaw, Meopham, near Gravesend, Daniel R. Lobb, Farnborough, and Anthony J. Allnutt, Chislehurst, England, assignors to British Scientific Instrument Research Association, South Hill, Chislehurst, Kent, England
Filed Jan. 16, 1970, Ser. No. 3,540
Claims priority, application Great Britain, Jan. 17, 1969, 2,971/69
Int. Cl. G01n 21/32
U.S. Cl. 356—196
13 Claims

ABSTRACT OF THE DISCLOSURE

A method of, and system for, automatically inspecting regular bodies, such as ceramic glazed tiles, for visual defects in its boundary and upper surface.

Each body is moved through stations having electro-optical devices for determining various classes of defects in the body. The devices which are used to inspect the upper surface of the body scan the surface and convert light diffusely or specularly reflected therefrom into a waveform composed of a series of pedestals which are analysed for defect-indicative information. The device used to inspect the boundary of the body acts to determine whether there are any irregularities, such as indentations or projections, in the boundary. Various techniques are provided to improve the validity of the defect detecting operation.

BACKGROUND TO THE INVENTION

The present invention relates to a method of, and a system for, inspecting regular bodies for visual defects. The invention is particularly, but not solely, concerned with inspecting bodies in the form of square glazed tiles made from a ceramic and of about 6 inches length. In the production of such tiles various types of defect can occur such as chips or lumps on the edges of the tile, irregularities in the glaze itself and irregularities in the colour of the tile.

A general object of this invention is to provide a system for detecting such defects automatically.

SUMMARY OF THE INVENTION

According to the present invention there is provided a method of inspecting a regular body having a continuous surface and a boundary to detect visible defects, said method comprising moving the body through a number of stations, directing electromagnetic radiation at said surface and the boundary of the body at said stations, converting the radiation influenced by the presence of the body into electrical signals characteristic of the visual appearance of the surface and boundary of said body, and ascertaining whether any of said signals contain information indicative of visible defects.

According to a further feature of the invention the body may be re-orientated during its movement through the stations.

Further according to the present invention there is provided a system for inspecting a regular body having a continuous surface and a boundary to detect visible defects, said system comprising a plurality of detecting devices disposed along a path of movement of said body, each device being adapted to direct electromagnetic radiation onto the body as it passes thereby and to convert the radiation influenced by the presence of the body into an electrical signal characteristic of the visual appearance of the surface or boundary of the body, and means for ascertaining whether any of said signals contain information indicative of visible defects.

In the case of rectangular sheet-like bodies such as glazed tiles a mechanism can be positioned between two of the devices for re-orientating the body through 90° so that two of its side edges disposed parallel to its direction of movement prior to the re-orientation become substantially perpendicular to the direction of movement subsequent to the re-orientation.

In a preferred embodiment the system has at least one device for detecting defects in a glazed rectangular body such as a tile which device utilizes an optical scanning arrangement adapted to scan the body in sequential parts and to collect radiation specularly reflected from the upper surface of the body during each scan. This collected radiation is fed to means for converting the radiation into electrical signals having a waveform comprising a series of pedestals each representing one scan of the surface of the body. Such signals are referred to as pedestals. The pedestals are fed to a differentiating circuit and a comparator is used to ascertain the number of times that the output from the circuit exceeds upper and lower reference levels. This number is counted for each scan and for a perfect tile this count will be two corresponding to the side edges of the tile. Counts in excess of two indicate defects.

In a preferred device for detecting defects in the surface of the body underneath or on top of the glaze a similar scanning arrangement is used. In contrast however the arrangement is made so that the received radiation has been reflected in a diffused manner.

The pulses derived from differentiating the pedestals and corresponding to the side edges of the body should nominally reach the same peak level. If this is not so then the side edge in question does not constitute a sharp discontinuity to the optical scanning arrangement. Means for comparing the peak levels of these pulses is therefore provided to indicate this type of fault.

Chips or lumps in the boundary or edges of the body are detected in a device which assesses whether the edges constitute substantially continuous lines. Any irregularities in the straightness of the edges causes the device to indicate a defect.

The device for detecting specular reflection defects preferably has means for altering the sensitivity of the device in accordance with the part of the body being inspected. This means is preferably triggered by means of photo-electric elements sensing the presence or absence of the leading and lagging ends of the body.

The invention may be understood more readily and various other features of the invention may become more apparent from consideration of the following description.

BRIEF DESCRIPTION OF DRAWINGS

Constructional embodiments of electro-optical devices used in a system made in accordance with the invention will now be described by way of examples only, in relation to the inspection of bodies in the form of glazed ceramic tiles and with reference to the accompanying drawings, wherein:

FIG. 1 is a block schematic diagram of the various devices of a system made in accordance with the invention;

FIG. 2 is a schematic end view of the device 10 of FIG. 1;

FIG. 3 is a plan view of part of the device of FIG. 2 with a tile present;

FIG. 4 is the view of FIG. 3 with the tile absent;

FIGS. 23 to 26 show electrical waveforms associated with the device of FIG. 21;

FIG. 27 is an end view of a device 10 shown in FIG. 35;

FIG. 28 is a plan view of the device of FIG. 27;

FIG. 35 is a block schematic diagram of the devices used in a further example of an electro-optical system;

FIG. 36 is a plan view of a tile depicting a modified scanning arrangement in relation to the device 14 of the system of FIG. 35; and FIGS. 37 and 38 show electrical waveforms produced by the modified scanning arrangement.

DESCRIPTION OF PREFERRED EMBODIMENT

Figure 5:
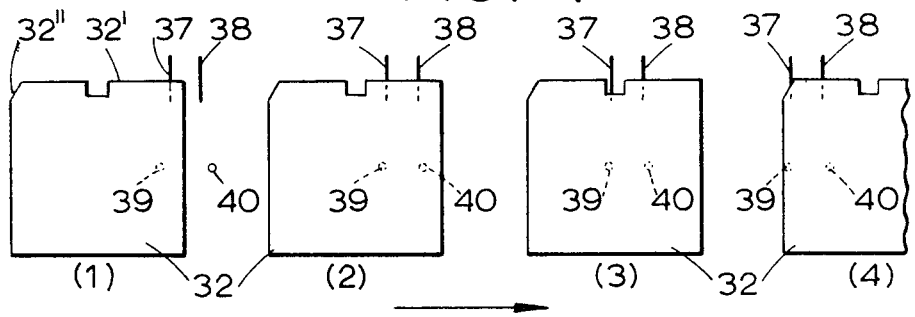
FIG. 5 is an illustration depicting the various positions of a tile in relation to the device of FIGS. 2 to 4.

The overall function of the system made in accordance with the present invention can be appreciated by considering FIG. 1. As mentioned, the invention is particularly concerned with automatically inspecting plain glazed ceramic tiles, widely used to decorate walls etc., to ensure that the tiles are not defective. The system in fact analyses each tile to ensure that it does not have any one of the following three classes of defects which can be considered separately:

(a) Flaws such as chips or lumps on the edges or corners of the tiles, (b) Flaws in the glaze on the upper face of the tile, and (c) Flaws such as colour spots or black spots on the upper surface of the glaze or within or beneath the glaze of the tile.

In one embodiment of the invention, depicted in FIG. 1, each tile is examined separately for each class of defect. Thus, as shown in FIG. 1, a tile to be inspected is passed by a conveyor assembly into a first detecting device 10 which determines whether the tile has any defects under class (a). If the device 10 finds any defects then the tile receives an identifiable marking from a marking device 11 actuated by the device 10. The tile is then fed to a second detecting device 12 which determines whether the tile has any defects under class (b). In a similar manner to the device 10 the device 12 acuates a marking device 13 should it locate any defect in the tile. Finally the tile is fed to a third detecting device 14 which determines whether the tile has any defects under class (c). Again, the device 14 is operably associated with a marking device 15. When the tile is passed out from the device 15 it is transposed through 90° in a horizontal plane by a mechanism 16. The now-transposed tile is then fed through devices 17 to 21 which are basically the same as the devices 10 to 14, respectively. The device 21 forms a master detecting device which detects the markings made by the devices 11, 13, 15, 18 or 20 and which may detect flaws not detected by the previous devices. Instead of using the marking devices 11, 13, 15, 18 and 20 an electronic memory device (not shown) can "remember" which tile is faulty and follow the tile through the system. A diverting mechanism 22 operated by the detector 21 or the memory device diverts faulty tiles off the conveyor assembly.

Each device 10, 12, 14 of the system depicted in FIG. 1 will now be considered separately in more detail.

The device 10, is an electro-optical device, the construction and operation of which can be appreciated from consideration of FIGS. 2 to 6. As shown in FIGS. 2 to 4, a light source 30 is disposed above a conveyor belt 31 on which a tile 32 to be inspected is transported. The conveyor belt 32 can transport six inch square tiles at the rate of about 4 tiles per second, although it may be possible to achieve rates of up to 10 tiles per second. The conveyor belt 31 is composed of two longitudinal parts 31a, 31b laterally spaced apart from one another. The light emitted by the source 30 is collimated by means of two lenses 33, 34 onto each of two light detectors generally designated 35, 36 in FIG. 2. The detectors 35, 36 operate photo-electrically and each detector 35, 36 has two photo-electric elements 37, 38 shown in FIGS. 3 and 4, which are spaced apart longitudinally of the conveyor belt 31. The elements 37 of the two detectors 35, 36 are laterally aligned with one another, as shown in FIG. 3, as are the elements 38 of the detectors 35, 36. Two further photo-electric elements 39, 40 are disposed between the parts 31a, 31b of the conveyor belt 31. The elements 39, 40 lie just outside of the imaginary lines joining the aligned elements 37, 38 as shown in FIG. 4. FIG. 3 depicts the situation when a perfect tile 32 is conveyed by the conveyor belt over the elements 37, 38, 39, 40 and in contrast FIG. 4 depicts the situation where there is no tile present. The elements 37, 38 of each detector 35, 36 are so arranged that an equal portion of each element 37, 38 will be covered in the presence of the tile 32. Thus, in the situations shown in FIGS. 3 and 4 the elements 37, 38 at each side of the conveyor belt 31 produce the same electrical voltage. The principle on which this device operates is to examine the two side edges 41, 42 of the tile 32 to determine whether these edges are continuous and straight. If a defect in class (a) occurs on either of the side edges 41, 42 then this edge will not be continuous and straight. The electrical outputs from the elements 37, 38 of each detector 35, 36 are fed to an analogue circuit 200 which effectively subtracts these outputs and the signals from the circuits 200 may then be combined either by addition or by subtraction shown schematically by the combining unit 202 so as to produce a single composite signal. Thus when there is no tile present or where there is a tile present which has a straight edge and partially covers both elements 37, 38 the said composite signal will be zero. The electrical voltages of the elements 39, 40 are fed to a logic AND gate 201 the output of which is in one state, i.e. 0 when both or only one of the elements 39, 40 is illuminated by light from the source 30 and in the other state, i.e., 1, when both elements 39, 40 are not illuminated.

Figure 6:
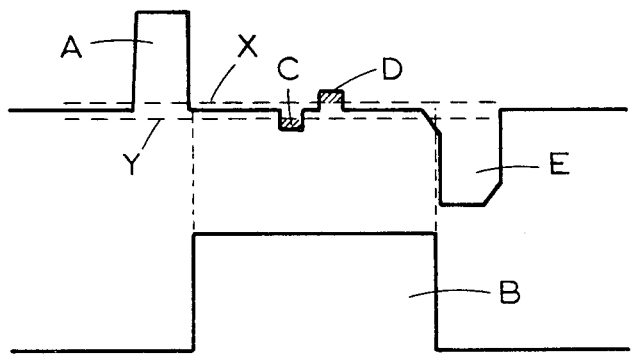
FIG. 6 shows electrical waveforms produced by the device of FIGS. 2 to 4.

The effect of defects in one side edge of the tile 32 can be appreciated by considering FIGS. 5 to 6. In FIG. 5 the elements 37, 38 at one side of the conveyor belt 31 are shown together with the centrally disposed elements 38, 40. The tile 32 in FIG. 5 is shown by way of example to have two faults, one in its side edge 32' and the other in its corner 32". The numerals 1 to 4 in FIG. 5 denote successive positions of the tile 32 as it is transported by the conveyor and the corresponding numerals used in FIG. 6 show the effect the movement of the tile 32 has on the waveforms from the device. In FIG. 6 the uppermost waveform is representative of the output of the combining unit 202 and the lowermost waveform is representative of the output of the AND gate 201 fed by the outputs of the elements 39, 40. In position 1 the elements 40 and 38 are fully illuminated, the element 39 is totally blocked off from the light source and the element 37 is partially illuminated. Thus there is an inbalance between the outputs of elements 37, 38 giving rise to the pulse A in the uppermost waveform. The leading end of the tile 32 reaches the element 38 just before it reaches the element 40. Hence the pulse A ends just before the pulse B starts in the lowermost waveform indicating that both elements 39, 40 have been covered by the tile 32. In position 2 the uppermost waveform indicates that both elements 37, 38 are receiving equal amounts of light. In position 3 however where the fault in the side edge 32' of the tile 32 reaches the element 37 the latter receives slightly more light than does the element 38. Consequently the imbalance produces the small pulse C in the upper waveform Shortly after the element 37 coincides with the fault the element 38 coincides with the fault and the situation is reversed with the element 38 producing a slightly greater output than that of the element 37. At this stage a further small pulse D occurs which is reversed in polarity relative to the pulse C. The upper waveform then proceeds normally indicating a straight edge until the fault at the corner causes the element 37 to receive more light than the element 38. Shortly after this fault reaches the element 37 the lagging edge of the tile allows the element 37 to be fully illuminated and thus the leading edge of a pulse E corresponding to pulse A is distorted as illustrated in the upper waveform. In an analogous manner to before the corner fault reaches the element 38 and the lagging edge of the pulse E is distorted as is its leading edge. The distorted portion of the leading edge of the pulse E appears before the end of pulse B. The upper waveform illustrated in FIG. 6 is fed to a comparator (not shown) which produces an output whenever the waveform rises above or falls below the preset voltage levels X and Y superimposed on FIG. 6. The comparator is however inhibited from operating unless the lower waveform B is present in its "1" state as shown. Thus, only the shaded portions of the upper waveform would appear at the output of the comparator to indicate that the tile under investigation is faulty. The tile 32 is re-orientated through 90°, e.g., by the mechanism 16 of FIG. 1, after passing through the device 10 so that its leading and lagging ends become its side edges which then are examined for faults in a further device of this kind (17 in FIG. 1). Within certain limits the tile has to be positioned substantially correctly on the conveyor belt so that it proceeds in a direction substantially parallel to its side edges. If this were not so the outputs from the elements 37, 38 could not be equated correctly but small lateral deviations will still give rise to a uniform electrical waveform which can still be analysed.

The positioning can be achieved by a suitable guiding arrangement on the conveyor belt. It is possible with a device of this kind to detect lumps or chips in the side edges of the tile which extend in the order of 1 mm. from the side edges and also in the order of 1 mm. from its leading and lagging ends relative to its movement.

The device 12 of FIG. 1 is again an electro-optical device and the construction and operation of this device can be appreciated by considering FIG. 7 to 20.

Figure 7:
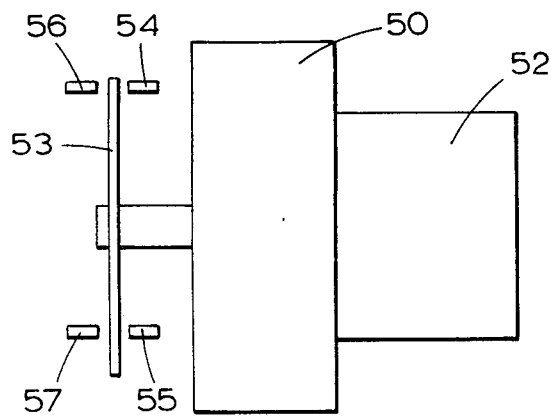
FIG. 7 is a schematic plan view of the scanning member of the device 12 shown in FIG. 1.
Figure 8:
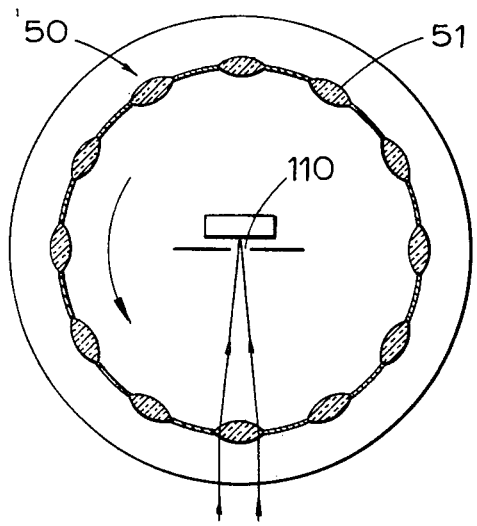
FIG. 8 is a schematic end view of the scanning member of the device in FIG. 7.
Figure 40:
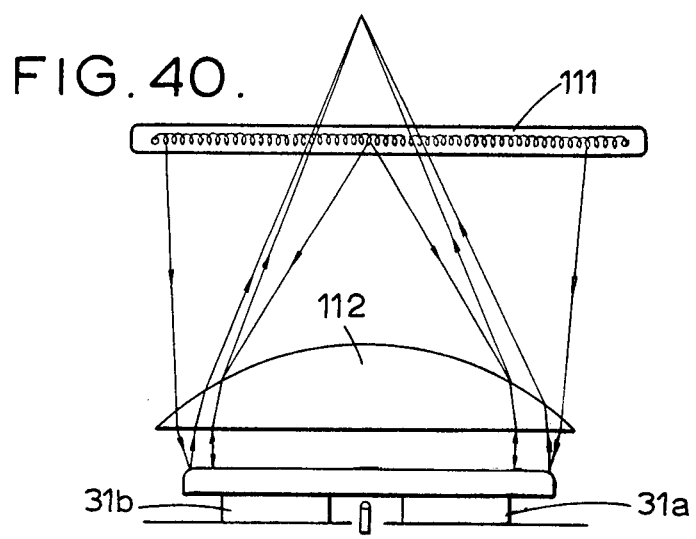
Figure 41:
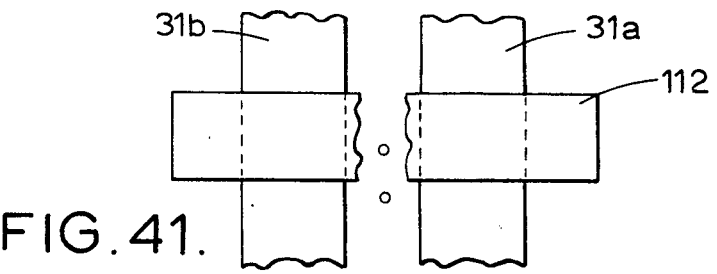

As shown in FIGS. 7 to 9 and FIGS. 39 to 41 an optical scanning member 50 is formed as a rotatable drum having a number e.g. twelve, lenses 51 symmetrically arranged around its periphery. The drum has a slit 110 arranged at its centre which, as shown in FIG. 8 receives light from each of the lenses 51 in turn, as the drum is rotated. The member 50 is arranged above the conveyor belt serving to transport the tile to be inspected and the upper face of the tile is illuminated with light from a main light source 111 (FIG. 40) at an angle such that light is specularly reflected into the member 50. To this end a cylindrical lens 112 is disposed over the conveyor belt, so as to concentrate the light emitted by the source 111. The lens 112 is preferably tilted slightly (FIG. 39) to prevent specular reflection occurring at its surfaces from entering the member 50. The light source 111 can be in the form of a long quartz iodine lamp as shown in FIG. 40. The light paths can be seen in FIG. 39. An external slit 113 (FIG. 39) can be positioned externally of the member 50. The slit 113 is fixed in position but adjustable in width to control the amount of light entering the member 50 and thus define the resolution, i.e. width of the region scanned. As the drum is rotated above the illuminated tile the lenses 51 receive light reflected from the tile and the slit in the drum receives successive separate moving images of the upper face of the tile. An optical arrangement (not shown) collects the light passing through the slit 110 and this collected light is converted into an electrical signal by a photo-electric unit 52 (FIG. 7).

If there is a fault in the glaze on the upper face of the tile being examined then according to the nature of the fault either less light will be passed through the lenses 51 of the member 50 in question, thus resulting in less light than normal being passed through the slit 110, or more light will be passed through the lenses 51, thus resulting in more light than normal being passed through the slit 110. The output from the unit 52 is in the form of a series of D.C. voltage pulses or pedestals such as shown in the uppermost waveform of FIG. 10. Each pedestal corresponds to one scan across the tile by one lens 51.

Figure 9:
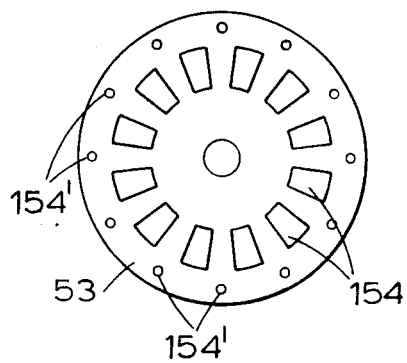
FIG. 9 is a view of the gating disc of the device of FIG. 7.

To produce gating pulses for the device 12 the function of which will be described hereinafter, a disc 53 see FIG. 9, is mounted for rotation with the drum of the scanning member 50. The disc 53 is provided with apertures 154, equally spaced around a circle described from the centre of the disc 53. The disc 53 is also provided with further apertures 154' equally spaced around a circle concentric with the said circle. As shown in FIG. 7, two light sources 54, 55 are arranged in horizontal alignment near one face of the disc 53. Near the other face of the disc 53 two photo-electric elements 56, 57 are disposed so that each can receive light from one of the sources 54, 55 when one of the apertures 154, 154' is horizontally aligned with the source 54, 55 and the element 56, 57 in question. As the disc 53 rotates, each element 56 will alternately be illuminated by and shut off from the source 54 by the sequentially-moving apertures 154' and each element 57 will alternately be illuminated by and shut off from the source 55 by the sequentially moving apertures 154. The output from the element 57 produces gating pulses each of which starts and ends when light is not being received by the slit in the drum of the member 50 and this corresponds to one scan i.e. one pedestal. The output from the element 56 produces clock pulses, the function of which will be described hereinafter, similar to the gating pulse. The relationship between the gating pulses and the output from the unit 52 is shown particularly in FIG. 10 where the uppermost waveform represents the output from the unit 52 and the lowermost waveform represents the gating pulses produced by the element 57.

Figure 11:
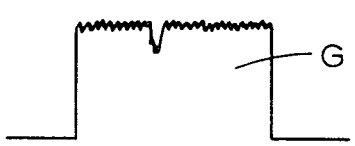
Figure 12:
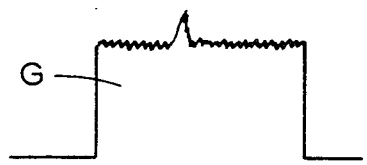

Each pedestal G, in the upper waveform, represents one scan of the member 50 and irregularities in the top of the pedestal will indicate faults in the glaze on the upper face of the tile. The faults may result in a sudden increase or a sudden decrease from the average level of the top of the pedestal, as shown in FIGS. 11 and 12 respectively.

Figure 10:
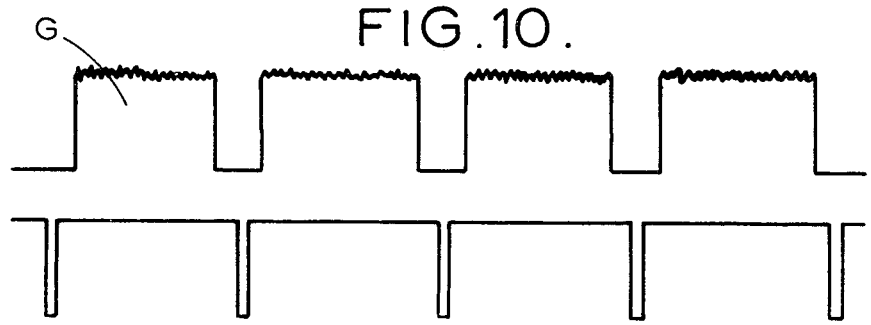
FIGS. 10 to 14 show electrical waveforms associated with the device of FIG. 7.
Figure 13:
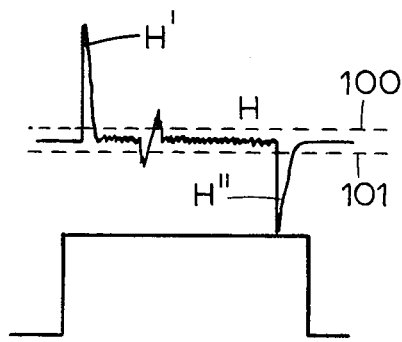
Figure 14:
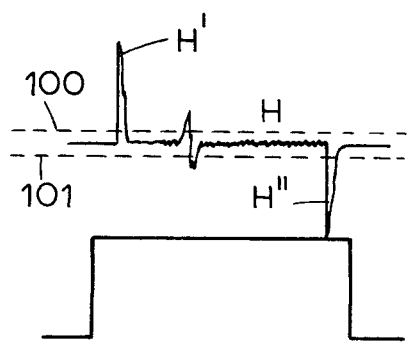

The upper waveform in FIG. 10 is fed through a differentiating circuit, and referring back to FIGS. 11 and 12 the single pedestals shown therein will produce the waveforms H shown in FIGS. 13 and 14 respectively. The gating pulses are also shown in FIGS. 13 and 14, for reference. Each waveform H corresponding to one of the pedestals is assessed by a comparator set to deliver an output wherever the waveform H exceeds the reference levels 100 and 101 in FIGS. 13 and 14. Thus for a normal pedestal containing no suddent deviation indicative of faults this comparator would produce two pulses corresponding to the pulses H', H'' of the waveform H which pulses in turn are produced by the edges of the pedestal, corresponding to the edges of the tile. Should a defect be present in the glaze of the tile then the number of pulses produced by the comparator will be greater than two. Thus by counting the total number of pulses produced by the comparator in excess of two during the duration of the gating pulse (FIGS. 13 and 14) an indication of whether the associated scan of the tile has any glaze faults can be obtained.

It still remains to differentiate between small definite faults in the glaze and non-uniform areas such as troughs disposed near the edges of the tile. Such non-uniform areas would be likely to be sensed by the device described above although from a visual aspect they would not be noticeable as faults.

Figure 15:
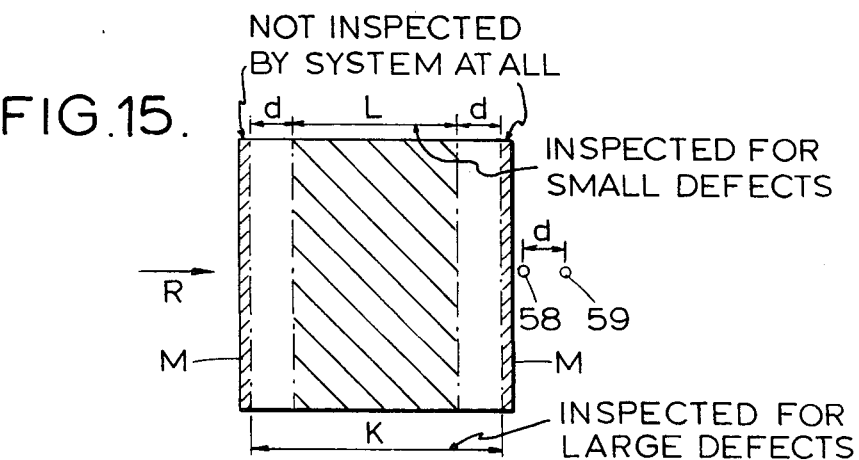
FIG. 15 is a plan view of a tile showing the relationship between certain regions inspected by the device of FIG. 7.
Figure 16:
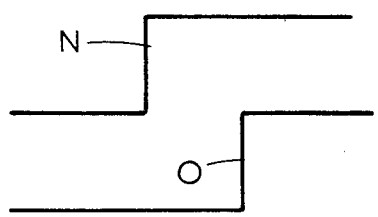
FIGS. 16 to 19 show further electrical waveforms produced by the device of FIG. 7.
Figure 17:
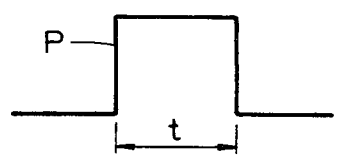
Figure 18:
Figure 19:
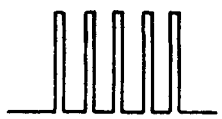
Figure 20:
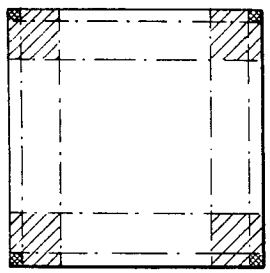
FIG. 20 is a view corresponding to that of FIG. 15 showing the relationship between the regions after the tile has been re-examined.

To distinguish between the true smaller faults and these troughs which are not regarded as faults the device is modified so that part of it examines the tile for large scale defects and part of it examines the tile for small scale defects. The way this modification works can best be appreciated by considering FIG. 15. The upper face of the tile 32 shown in FIG. 15 is effectively divided into regions. The tile is conveyed in the direction of arrow R. The largest region K is examined for large scale defects by the device operating in the manner outlined above but somewhat de-sensitized, the smaller region L is examined for small scale defects by the device at normal sensitivity also operating in the manner outlined above, and the smallest regions M at each end of the tile are not examined at all by the device. To control the operation of the part of the device 12 looking for small scale defects in region L two photo-electric elements 58, 59 are disposed between the conveyor belt parts 31a, 31b (FIGS. 2 to 4) and these elements 58, 59 are separated longitudinally of the conveyor belt 31 by a distance d. The photoelectric elements 58, 59 are illuminated by the main light source whenever the tile 32 is not present to intercept the light. As the leading end of the tile 32 is passed over the elements 58, 59 the elements 58, 59 produce electrical output signals from which signals having leading edges as shown in FIG. 16 are derived. In FIG. 16, N denotes the leading edge of the signal derived from element 58 and O denotes the leading edge of the signal derived from element 59. A logic pulse P shown in FIG. 17 is in turn derived from the signals N and O such that the duration of the pulse P is equal to the time interval between the leading edges of the signals O and N. The clock pulses produced by the element 56 associated with the disc 53 are shown for comparison purposes in FIG. 18; each clock pulse corresponds to one pedestal. The device 12 initially operates at a reduced sensitivity. Two counters count the number of clock pulses which occur during the time duration of the pulse P and five pulses are shown by way of example of such a count in FIG. 19. Thereafter one of the counters storing, for example, a count of five, counts down one at a time upon the occurrence of each pedestal which is of sufficient magnitude to indicate specular reflection. When this counter reachest zero a signal is generated to initiate the pertinent part of the device to operate at normal sensitivity as described above, and examine the tile for small area defects. However, the device will not register a defect unless the sceond counter operates in a certain manner. If a defect is detected by the device, the second of the two counters which has retained its count, in this example five, is allowed to count down at the rate of one count per pedestal. If the second counter reaches zero before the last pedestal of sufficient magnitude for the particular tile in question has been generated then the device is allowed to register the defect. If this is not the case, then the defect has occurred in the zone M near the lagging end of the tile in FIG. 15 and is therefore not registerable as a small scale defect. The large scale defects are assessed separately but substantially the whole surface of the tile is not examined until the tile is re-orientated through 90° and re-analysed. The effect of the full examination by the devices (12, 19 FIG. 1) is depicted in FIG. 20. The blank area of the tile is examined for all defects in the glaze, the crosshatched area of the tile examined for large scale defects only and the shaded area of the tile is not examined at all.

The final device to be considered is designated 14 in FIG. 1 and is used to detect any spot like defects on the surface of the glaze or on the surface beneath the glaze. This device is again an electro-optical device and the construction and operation of this device can be appreciated from consideration of FIGS. 21 to 26.

Figure 21:
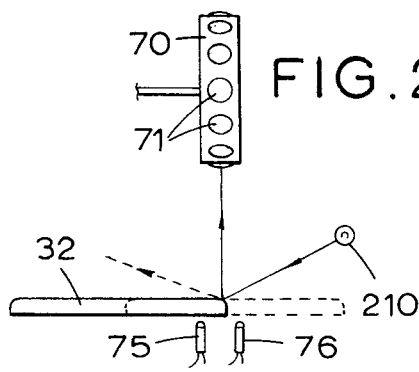
FIG. 21 is a schematic side view of the device 14 of FIG. 1.
Figure 22:
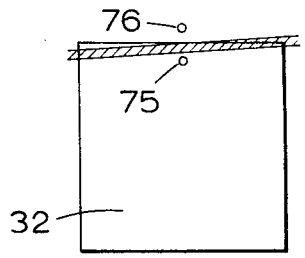
FIG. 22 is a plan view of a tile showing the scanning thereof by the device of FIG. 21.
Figure 23:
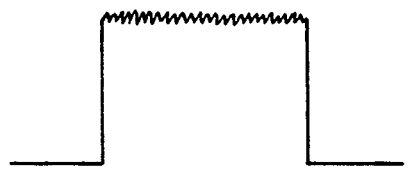

The general principle behind the operation of the device 14 is much the same as that of the device 12. Again, as shown in FIG. 21, a scanning member 70 in the form of a drum has a number of lenses 71 arranged on its periphery and the drum is rotated above the upper face of the tile 32. A disc, not shown, is used to produce gating pulses in a similar manner to that previously described in connection with the device 12. In this arrangement mirrors can be disposed at the sides of the conveyor to cause the light source to appear infinitely long. The drum has a slit disposed within it and this slit receives diffusely reflected light from the upper face of the tile 32 which is focussed by each of the lenses 71 in turn as each lens 71 scans the tile surface. In contrast to the device 12 however the optical arrangement is made such that generally no specularly reflected light enters the scanning member 70 and this is depicted in FIG. 21 (dotted line) by the disposition of the light source 210 associated with the device 14. The length of the slit in the drum defines the width of the scanned strip and one of these scanned strips is shown in FIG. 22. The device 14 effectively detects faults in the tile surface under class c which cause increases or decreases in the amount of light reflected diffusely from the tile surface. As in the case of the device 12 a series of signal pedestals is derived from the scanning member 70. These pedestals can be analysed in the same manner as generally described in connection with the device 12.

In addition however the device 14 is required to examine the regions right on the edges of the tile and also, if the tile is coloured, the device 14 should be able to recognise colour changes which extend right across the tile.

The effect that these type of defects have upon the pedestals is shown in FIGS. 25 and 26 where the uppermost waveforms show, respectively, the effect of a diffuse defect at one edge of the tile and the effect of a gradual colour change. The lower waveforms in these figures show the corresponding differentiated signals.

The peak level of the first differentiated pulse T in each case is compared to that of the second pulse U. If different, within limits, a fault register is initiated, if the same, then a good tile is indicated.

The device 14 cannot inspect the whole area of the upper surface of the tile since the first few pedestals derived from scanning at the leading end of the tile must be disregarded since the light is reflected specularly (FIG. 21 full line) and will give rise to a pedestal of which both the height and the fluctuations in height will greatly exceed those obtained by diffuse reflection, and will thus give rise to false indications of a fault.

Figure 24:
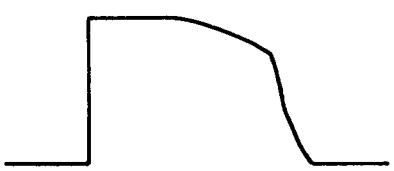

Also should the tile be misaligned on the conveyor belt the ends of the tile may produce mis-shaped pedestals such as is shown in FIG. 24. The first and last pedestals are preferably inhibited and to achieve this two photoelectric elements 75, 76 are disposed between the parts 31a, 31b of the conveyor belt and longitudinally spaced apart, as shown in FIG. 22. These elements 75, 76 are illuminated whenever a tile is not present and the outputs of the elements 75, 76 used to produce pulses initiated by the leading and lagging ends of the tile. These pulses are used to inhibit the first few pedestals and the last few pedestals from acting upon the device.

As mentioned before, after passing through the device 14 as described a tile is re-orientated through 90° and re-examined in a further device 21, constructed and operating in the same manner as the device 14.

The system as described above can be modified somewhat in order to inspect tiles of more uniform structure especially plain white tiles. The modifications described hereinafter can dispense with the devices 17 to 21 which it will be remembered serve to re-examine the tile after it has been turned through 90°.

In the modified system shown in FIG. 35 the device 10 operates in the same manner as described but in addition the device includes facilities for inspecting the extreme side edges of the tile for glaze faults which might not be detected by the glaze fault detecting device 12.

Figure 29:
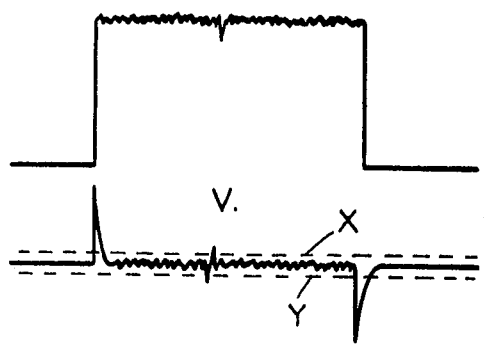
FIGS. 29 and 30 show electrical waveforms associated with the device of FIG. 27.

As shown in FIGS. 27 and 28, a light source 80 is disposed above the tile 32 which again is transported on the two-part conveyor belt 31. Light from the source 80 is directed onto the two side edges of the tile 32 via lenses 98, 99. The tile is conveyed in the direction of arrow U. The light reflected from the arcuate part of the side edges is focused by lenses 81, 82 onto two photo-electric devices 83, 84 each of which converts the light received thereby into a D.C. voltage pedestal, see FIG. 29, corresponding to the length of the side edge in question. A fault in the glaze at either of the side edges will result in a sudden increase or decrease in the light received by the associated device 83, 84, such as is shown in FIG. 29.

Figure 30:
Figure 32:
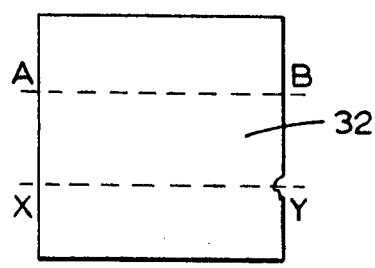
FIG. 32 is a plan view of a tile showing an edge defect.
Figure 33:
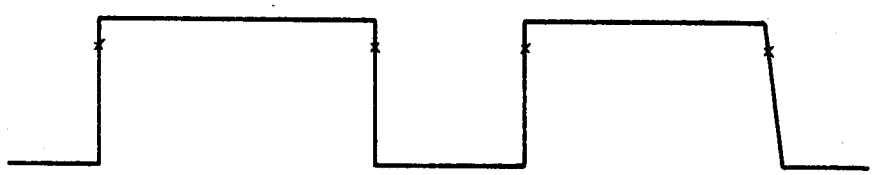
FIGS. 33 and 34 show electrical waveforms associated with the device 14 of FIG. 35.

As with the device 12 the voltage pedestals are differentiated in a suitable circuit. Thus, in the case of the pedestal shown in FIG. 29 a waveform such as shown as V in FIG. 30 will be produced. To produce gating pulses two photo-electric elements 86, 87 are disposed between the parts 31a, 31b of the conveyor belt 31 and longitudinally spaced from one another. These elements 86, 87 receive light from the source 80 when the tile is not present to intercept the light. The outputs from the elements 86, 87 are used to derive a gating pulse, shown as W in FIG. 30 which is present when the tile covers both the elements 86, 87. Again a comparator assesses the upper and lower levels of the waveform V during the duration of the gating pulse and a counter indicates the number of times that the waveform V exceeds the levels X, Y in FIG. 30. A count of two indicates a good tile and a count in excess of this indicates a faulty tile.

To avoid the need to re-examine the tile for chips in its edges after it has been re-orientated through 90° the device 14 for detecting diffuse faults can be modified to include facilities for examining the tile for chips along its side edges, which were its leading and lagging ends before re-orientation by the mechanism 16. These modifications can be appreciated by considering FIGS. 31 to 34.

Figure 31:
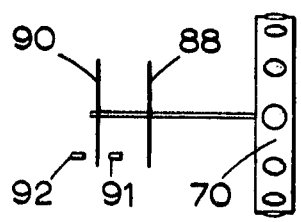
FIG. 31 is a view of the scanning member of the device 14 shown in FIG. 35.
Figure 34:
Figure 39:
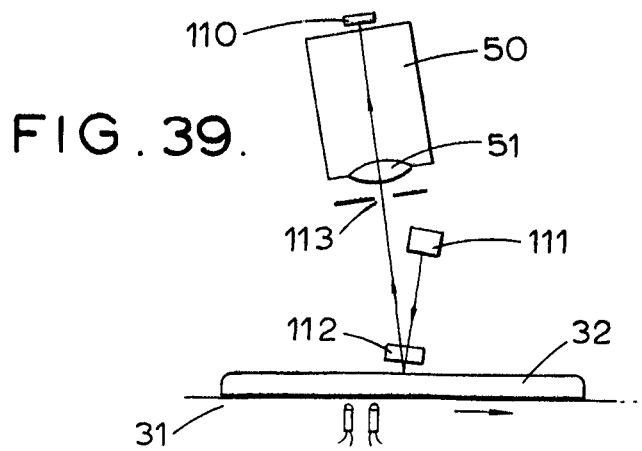
FIGS. 39 to 41 are side, end and plan views, respectively, of the device 12 shown in FIG. 1.

A disc 90 having a large number of radial lines thereon to form a radial grating is mounted for rotation with the scanning member 70 (FIG. 31). The disc 90 can be mounted on the side of the disc 83, used for producing gating pulses, remote from the member 50 as is shown in FIG. 31. A light source 91 is disposed on one side of the disc 90 and a photo-electric element 92 is disposed on the other side of the disc 90. Rotation of the disc 90 will cause the element 92 to produce a number of pulses such as shown in FIG. 34. If a tile 32 has a defect such as a chip shown in FIG. 32 the scanning pedestals derived from the member 50 would thus appear as in FIG. 33, where the first pedestal corresponds to the scan A–B in FIG. 32 and the second pedestal corresponds to the scan X–Y in FIG. 32. To detect the presence of the chip which gave rise to the distorted lagging edge in the second of the pedestals shown in FIG. 33 the number of pulses are counted for the duration of a level of each pedestal taken near its average peak level. For a normal pedestal the count would reach a predetermined figure but for the second pedestal in FIG. 33 the count will be less than normal. If a lump were present in the side edge of the tile then the count will be greater than normal and hence a count less than or greater than normal is indicative of a defect.

A further modification can be made to the device 14 of FIG. 35 and possibly also to the device 12 to ensure that the system will detect defects in the side edges of the tile more reliably than is the case with the basic system. This modification is of particular use in inspecting better quality white tiles and can be appreciated from FIGS. 36 to 38. As shown in FIG. 36 the title is superimposed on a plain white band 310 to produce a scanning pedestal such as $\alpha$ in FIG. 37. When differentiated the pedestal $\alpha$ will produce the waveform $\beta$ shown in FIG. 37. The comparator reference levels are designated X and Y in FIG. 37. With the normal pedestal such as is shown in FIG. 38 and end pulses 10' and 11' in waveform $\beta$ would correspond to the tile edge and would have a duration T. The duration T corresponds to an "uncertainty region" in the tile since if a fault is present in the tile scanned during this time it will not be detected. By scanning over the band 310 the end pulses 10 and 11 do not now relate to the tile edges and the pulses 12' and 13' which do relate to the tile are smaller and thus have a duration $u$ which is less than that of the duration T. This modification requires that the system should register counts derived from the comparator which are in excess of four and not two as was previously the case.

In a further functionally similar modification, the band 310 is not used but the normal pedestal, FIG. 38, is fed to a clamping circuit which removes a lower part $\gamma$ of the pedestal. This would then give rise to smaller end pulses when differentiated and thus a smaller uncertainty duration, although the fault indicating information will still be of the same magnitude.

We claim:
1. A system for automatically inspecting bodies having a continuous surface and edge boundaries to detect the presence of flaws comprising;
   a plurality of inspection units for detecting different forms of flaws, at least one detecting boundary edge flaws and at least one detecting surface flaws;
   means for moving the bodies in succession through the inspection units;
   means in at least one inspection unit for directing electromagnetic radiation at the boundary edge of the bodies;
   means in at least one inspection unit for directing electromagnetic radiation at the surface of the bodies;
   means in at least one inspection unit for collecting electromagnetic radiation reflected from the boundary edge of a body and generating electric signals representing the condition of the boundary edge;
   means in at least one inspection unit for collecting electromagnetic radiation reflected from the surface of a body and generating electrical signals representing the condition of the surface;
   means for comparing the generated electrical signals to determine if any flaws exist in a particular body, and
   means for rotating the bodies in the horizontal plane during movement between inspection units.

2. A system as in claim 1 where the bodies have a rectangular shape and are moved through a first inspection unit with two of its side edge boundaries extending substantially parallel to the direction of movement, the body is rotated 90° by the means for rotating and its two other edge boundaries are moved parallel to the direction of motion prior to passing through a second inspection unit.

3. A system as in claim 1 where the means for collecting electromagnetic radiation from the surface includes at least one scanning arrangement located at one of the inspecting units, the scanning arrangement serving to scan the surface of each of the bodies in sequential parts and generally transverse to the direction of movement of the body between two side edge boundaries thereof as the latter is moved past the arrangement so as to collect radiation specularly reflected by the surface.

4. A system as in claim 1 where the means for collecting electromagnetic radiation from the surface includes at least one scanning arrangement located at one of the inspecting units, the scanning arrangement serving to scan the surface of each of the bodies in sequential parts and generally transverse to the direction of movement of the body between two side edge boundaries thereof as the latter is moved past the arrangement so as to collect radiation diffusely reflected by the surface.

5. A system as in claim 1 where the means for collecting electromagnetic radiation from the surface includes at least a first scanning arrangement located at one of the inspecting units, the first scanning arrangement serving to scan the surface of each of the bodies in sequential parts and generally transverse to the direction of movement of the body between two side edge boundaries thereof as the latter is moved past the scanning arrangement so as to collect radiation specularly reflected by the surface, and at least a second scanning arrangement located at another of the inspecting units, the second scanning arrangement serving to scan the surface of each of the bodies in sequential parts and generally transverse to the direction of movement of the body between two side edge boundaries thereof as the latter is moved past the second scanning arrangement so as to collect radiation diffusely reflected by said surface.

6. A system as in claim 1 further comprising scanning means located at each inspecting unit and including a plurality of static-photo-electric elements arranged to receive radiation not intercepted by the side edge boundaries of the bodies to thereby detect irregularities in the form of indentations or projections in the side edge boundaries of the bodies.

7. A system as in claim 5 further comprising means for deriving a series of voltage pedestals from the radiation collected by each scanning arrangement, each of the pedestals representing one scan of the surface of one of the bodies.

8. A system as in claim 5 further including means for modifying the sensitivity of the specular reflection first scanning arrangement in accordance with the particular part of the surface being scanned.

9. A system as in claim 6 wherein each scanning means is provided with circuit means for sensing imbalance between the electrical outputs of the photo-electric elements operably associated with one of the side edge boundaries of each of the bodies to thereby detect irregularity in the one side edge boundary.

10. A system as in claim 5, wherein the means for comparing electrical signals includes a differentiating circuit receiving the pedestals, a comparator for determining whenever the output from the differentiating circuit exceeds upper and lower reference levels, a counter for counting the number of times the reference levels are exceeded by the output and means sensitive to the count for indicating a defective body.

11. A system as in claim 8 further including means to inhibit the operation of the diffuse reflection second scanning arrangement when scanning occurs near the edges of each of the bodies.

12. A system as in claim 10 further including deflector means for removing flawed bodies and means for comparing the amplitudes of the maximum peak levels of the output pulses of the differentiating circuit and actuating the deflection means.

13. A system as in claim 12 further including counter means for determining the time during which each of the pedestals exceeds a pre-determined level to determine a flawed body and a third inspection unit to cross check the prior inspection units.

References Cited
UNITED STATES PATENTS

| 2,659,823 | 11/1953 | Vossberg | 250—219 WD |
| 3,216,311 | 11/1965 | Bibbero et al. | 250—219 LG |
| 3,479,518 | 11/1969 | Akamatsu et al. | 356—200 |

RONALD L. WIBERT, Primary Examiner

O. B. CHEW II, Assistant Examiner

U.S. Cl. X.R.

250—219 DF; 356—237